United States Patent [19]

Bridges

[11] Patent Number: 4,875,305
[45] Date of Patent: Oct. 24, 1989

[54] SLOWLY DISSOLVING FISHING LURE ATTACHMENT WITH SCENT MIXTURE

[76] Inventor: John O. Bridges, 525 W. Ash St., Fullerton, Calif. 92632

[21] Appl. No.: 311,748

[22] Filed: Feb. 17, 1989

[51] Int. Cl.$^4$ .............................................. A01K 85/00
[52] U.S. Cl. ........................................... 43/42.06; 43/4
[58] Field of Search ............................ 43/4, 4.5, 42.06

[56] References Cited

U.S. PATENT DOCUMENTS

| | | | |
|---|---|---|---|
| 2,827,376 | 3/1958 | Breuer | 43/42.06 |
| 3,605,316 | 2/1969 | Rogers | 43/42.06 |
| 4,050,181 | 9/1977 | Young et al. | 43/42.06 |
| 4,205,476 | 6/1980 | Hsu | 43/42.06 |
| 4,736,542 | 4/1988 | Floyd | 43/42.06 |

OTHER PUBLICATIONS

In-Fishermans: Jul. 88, p. 149, "Crappie Candy".

Primary Examiner—Nicholas P. Godici
Assistant Examiner—Michael William Starkweather
Attorney, Agent, or Firm—Plante Strauss Vanderburgh

[57] ABSTRACT

There is disclosed a fishing lure having a fish attractant body which is formed of a water soluble polymer having a slow dissolution rate. The polymer contains a fish scent attractant. The fish scent attractant can be encapsulated within the polymer, e.g., fish or blood meal can be included in the polymer so that it will be slowly dispensed into the water as the polymer dissolves. The preferred polymer is polyvinyl alcohol having a preselected degree of hydrolysis of its ester groups to achieve the desired water solubility rate, and optionally plasticized with glycerol. The attractant can be a sheet which has a plurality of parallel and coextensive slits to provide parallel strips that depend from an unslit portion thereby permitting the sheet material to be wrapped about a lure body and secured in place so that the parallel strips extend rearwardly from the body, permitting them to undulate in the water as the lure is pulled through the water simulating the swimming movements of a small fish. Other embodiments include solid form lures shaped from polyvinyl alcohol which is gelled with a soluble borate.

12 Claims, 2 Drawing Sheets

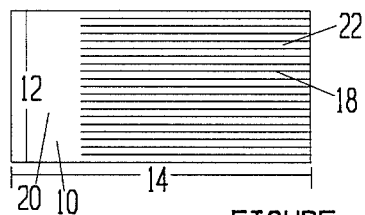
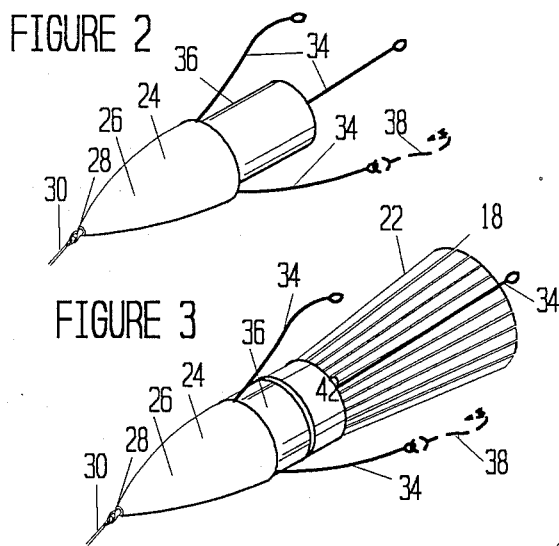
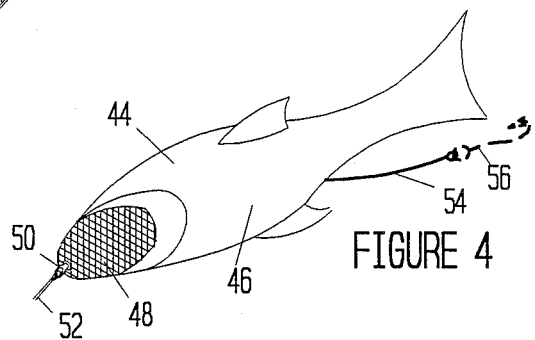

SLOWLY DISSOLVING FISHING LURE ATTACHMENT WITH SCENT MIXTURE

BACKGROUND OF THE INVENTION

1. Field of the Invention

This invention relates to a fishing lure and, in particular to a fishing lure having an odor attractant.

2. Brief Statement of the Prior Art

Fishing lures have been used in a myriad of shapes and forms. Generally, the objective is to provide a lure that will visually attract fish and, for this purpose, various lures which provide visible indication such lures with light reflective surfaces, and lures which provide a swimming motion when pulled through the water have been used. No truly successful method has been used heretofore for attracting the fish with an odor attractant. One difficulty with a fishing lure that uses an odor attractant is that the lure is generally used for trolling in sport fishing and is in constant movement through the water. If the odor attractant is not dispensed into the water it can only provide an odor immediately surrounding the lure. As the odor is dispensed, it remains at the location where it was dispensed, and the lure will be moved away from the odor attractant during trolling.

There is a need for a lure which will dispense an odor attractant continuously as the lure moves through the water, thereby providing a trail of the odor attractant which will lead fish to the lure.

OBJECTIVES OF THE INVENTION

It is an object of this invention to provide an effective fishing lure.

It is an objective of this invention to provide a fishing lure that continually dispenses an odor attractant.

It is further an object of this invention to provide the aforementioned odor attractant as a complete fishing lure including a lure body and fishing hooks.

It is an object of this invention to provide a fishing lure with a lure body that continually dispenses an odor attractant and that can be replenished or replaced for repeated use.

Other and related objectives will be apparent from the following description.

BRIEF DESCRIPTION OF THE INVENTION

This invention comprises a complete lure including a lure body with one or more fishing hooks and with a replaceable odor attractant body which is formed of a water soluble polymer having a slow dissolution rate and that includes a fish scent attractant. The fish scent attractant can be encapsulated within the polymer, e.g., fish meal can be included in the polymer so that it will be slowly dispensed into the water as the polymer dissolves. A water soluble polymer is polyvinyl alcohol having a preselected degree of hydrolysis of its ester groups to achieve the desired water solubility rate, and optionally plasticized with glycerol. The attractant is preferably provided as a sheet which has a plurality of parallel and coextensive slits which extend substantially, but not entirely the length of the body. This provides a sheet having a plurality of parallel strips that depend from an unslit portion thereby permitting the sheet material to be wrapped about a lure body and secured in place so that the parallel strips extend rearwardly from the body, permitting them to undulate in the water as the lure is pulled through the water simulating the swimming movements of a small fish.

BRIEF DESCRIPTION OF THE DRAWINGS

The invention will be described with reference to the figures of which:

FIG. 1 is an illustration of the preferred sheet material form of the lure attractant;

FIG. 2 illustrates a suitable lure body used in combination with the attractant lure of FIG. 1;

FIG. 3 is a perspective view of the assembled fishing lure of the invention; and FIG. 4 is a perspective view of an alternative fishing lure of the invention.

DESCRIPTION OF PREFERRED EMBODIMENTS

Figure 5:
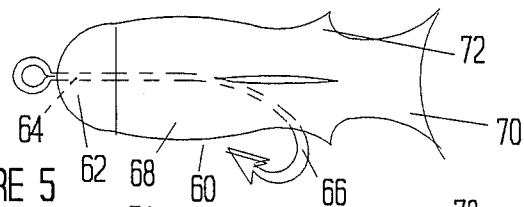
FIG. 5 is an elevational view of another alternative fishing bait of the invention.

Referring now to FIG. 1, the lure attractant 10 of the invention is provided in the form of a sheet of material having a thickness which is typically from about 0.1 to about 0.75 inch, preferably from about 0.125 to about 0.375 inch. The material is provided as a sheet having a width 12 and length 14 that is chosen with respect to the fishing lure with which it will be used. The width 12 should be sufficient that it will permit the lure attractant 10 to be wrapped at least once about the body of the fishing lure, and the length 14 should be sufficient to provide a suitably long tail 16 that will exhibit a swimming motion in the water during trolling to provide a visual attraction to fish. Typically the sheet has width and length dimensions from about 2 to about 5 inches in width and from about 3 to about 8 inches in length.

The sheet is provided with a plurality of parallel slits 18 that extend substantially, but not entirely, the length 14 of the sheet. This forms an unslit portion 20 that retains the parallel strips 22 which are formed by the slits 18. The parallel slits 18 are preferably coextensive so that the parallel strips 22 are substantially identical.

The fishing lure with which the lure attractant 10 is used can have various forms. A suitable form is shown in FIG. 2, as having a generally cylindrical body 24 which can be hollow or solid form. The forward end 26 of the lure body 24 can be smoothly tapered, preferably conically, as shown, and terminates with a distal eyelet 28 that receives a leader 30 to secure it to the fishing line. At least one 32 and preferably several additional leaders extend rearwardly from the forward end 26 of the lure body 24 and at least one of these leaders 34 can extend centrally through the lure body terminating shortly beyond the rear end 36 of the lure body 24. These leaders are conventional in construction and can have conventional distal eyelets 38 which will receive hooks 40, shown in broken lines.

The aforedescribed lure body 24 is substantially conventional in design and has been used previously with various flexible skirts to provide a visually attractive lure for fish.

Referring now to FIG. 3, the invention is shown in assembled form. The lure attractant 10 of FIG. 1 is applied about the central and rear end 36 of the lure body 24 and being wrapped at least once about body 24 and secured in place by a suitable means such as the wire tie 42. Other fastening means can of course be employed. The flexible parallel strips 22 that extend rearwardly from the lure body 24 will undulate in the water when the lure is used in a trolling manner thereby providing the desired visual indication of a swimming motion to fish.

As previously mentioned, the lure attractant 10 is formed of a polymer having a slow dissolution rate in water. Various polymers can be used for this purpose. Suitable water soluble polymers include methyl cellulose, hydroxypropyl cellulose, polyethylene oxide and polyvinyl alcohol. Of these, polyvinyl alcohol is the most preferred for the application as it is available in varied degrees of hydrolysis, thereby providing a close control over its degree of water solubility and rate of dissolution.

The time for the polymer to dissolve in water at ambiment temperatures is effected by the degree of hydrolsis of its ester groups. Polyvinyl alcohol is prepared by the polymerization of a vinyl ester, usually vinyl acetate. The resulting polymer is hydrolyzed to prepare the desired polyvinyl alcohol, and the degree of hydrolsis affects its rate of dissolution in water. As examples, at 88% hydrolysis, the polymer will dissolve in approximately 10 seconds in water at ambient temperatures. At 96% hydrolysis, the polymer will dissolve in approximately 400 seconds and as the degree of hydrolysis increases above 96% the time for dissolution in water greatly increases. For purposes of this invention, polyvinyl alcohol having at least 88 percent hydrolysis is useful, and polyvinyl alcohol having 96 percent or greater hydrolysis is preferred. If desired, the polyvinyl alcohol can also be crosslinked with glyoxal, urea-formaldehyde and melamine-formaldehyde to reduce its water dissolution rate.

The sheet of polyvinyl alcohol for the lure attractant 10 can be prepared from a water solution of the polyvinyl alcohol, typically formed at about 10 weight percent polyvinyl alcohol, optionally with an amount of a plasticizer, most preferably, glycerol, from about 0.1 to about 1 percent.

The scent for the odor attractant is imparted to the polyvinyl alcohol by dissolving or suspending a limited amount of a fish product such as fish meal, fish flavoring, etc. in the aforementioned solution of polyvinyl alcohol. The amount of this scent attractant that is included in the polyvinyl alcohol can be from about 0.5 to about 10 weight percent, preferably from about 1 to about 3 weight percent. If desired, other materials such as fish scales and the like can also be suspended in the polyvinyl alcohol solution to provide a visual attractant to the fish.

Odor enhancers can be added to the polyvinyl alcohol suspension to improve the effectiveness of the lure. It is believed that these enhancers function to mask or suppress the ester odor from the polyvinyl alcohol and promote a more aromatic odor, which is more attractive to fish. One class of chemicals which has proven effective as enhancers is aliphatic mono, di- and tri-substituted amines, wherein the aliphatic group has from 2 to about 10 carbons, e.g., ethyl amine, diethyl amine, triethyl amine, di-butyl amine, propyl amyl amine, dihexyl amine, etc. Preferably the aliphatic group has from 2 to about 5 carbons, and of these, di-ethyl amine has been found to be particularly effective.

After the polyvinyl alcohol has been dissolved to form the water solution, and the attractant, odor enhancer, and any other insoluble additives have been added to the resulting solution, the sheet for the odor attractant 10 is formed. This is preferably accomplished by casting of the polymer, simply by pouring the solution into a mold and permitting it to cure into the desired final shape. For the sheet material shown in FIG. 1, the solution is poured onto a flat tray and permitted to cure to a solid polymer.

The lure can be provided in other forms such as that illustrated in FIG. 4. In this form, the fishing lure 44 is provided with a solid form body 46 in a fish shape having a fabric backing 48 or inner core with a molded solid form body 46 formed of the water soluble polymer. If desired, the polyvinyl alcohol can be expanded by incorporating a water soluble borate in the solution of polyvinyl alcohol. The borate provides a controlled degree of gelation of the polyvinyl alcohol solution. For this purpose, boric acid or sodium borate are preferred and are used at concentrations of from about 0.01 to about 1, preferably from about 0.08 to about 0.2, weight percent. The body 46 has an eyelet 50 which is attached to the fabric backing 48 and which receives a leader 52 for attachment to a fishing line. One or more trailing leaders 54 receive fish hooks 56 thereby providing a complete fishing lure.

The attractant lure of the invention is assembled to the fishing lure body shown in FIG. 2 or is formed as a solid form lure as shown in FIG. 4 and used in conventional fish trolling. The attractant lure slowly dissolves in the water leaving a trail of fish meal which is a very strong scent trail for fish. The fish follow this trail to the bait and are sufficiently attracted to take the bait and become snared on the fish hooks.

Referring now to FIG. 5, the invention can be used in the form of a fishing bait 60 having a weighted head 62 which surrounds a leader 64 and terminates in a hook 66. A solid form lure 68 is received over the hook 66 and leader 64, and for this purpose the hook and leader can be threaded through the solid form lure 68, with the hook 66 received within, or slightly protruding from, the body of the solid form lure. The lure can be provided with a tail 70 and fins 72 for a visual attraction and to provide the desired movement as the bait it trolled through the water.

Figure 6:
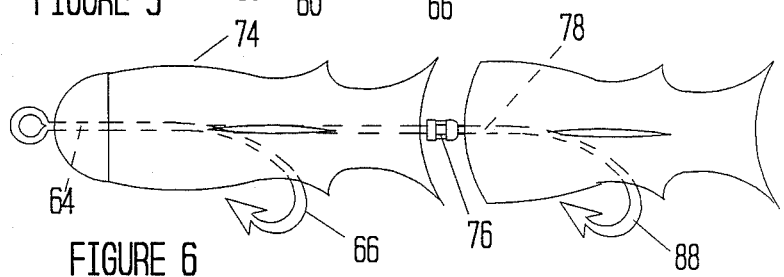
FIG. 6 is an elevational view of another alternative fishing bait of the invention.

FIG. 6 illustrates a bait 74 according to the invention with an articulated body. For this purpose, the first leader 64 has a distal coupling 76, which is preferably a swivel coupling that is attached to a second leader 78. The second leader 78 supports a hook 80, and, preferably, the first leader 64 also supports a hook 66, both of which are received within and entirely or partially surrounded by the solid form lures.

The solid form lures can be formed of a cellular, sponge material, such as natural sponge, or plastic sponge such as polyethylene sponge, etc. The sponge is saturated with a polyvinyl alcohol solution which contains a fish attractant such as fish meal, blood meal, etc., and a water soluble borate gelling agent, e.g., sodium borate, at a concentration of about 0.01 to 1 weight percent in the polyvinyl alcohol solution. The fish attractant is present in an effective amount, typically from about 2 to about 25 weight percent in the polyvinyl alcohol.

The polyvinyl alcohol solution gels within the sponge and the sponge thus reduces or retards the rate of dissolution of the polyvinyl alcohol when the lure is placed in water. This prolongs the useful life of the lure, permitting it to be used repeatedly, before requiring replacement with a fresh sponge lure.

The solid form lures can be prepared from stock or slab foam which is impregnated with the aforementioned gelling solution of polyvinyl alcohol, and the lures can simply be stamped or die cut from the foam. The fins and tail can be cut with shapes and sizes which provide desirable movements of the lure when the lure is trolled through the water.

Figure 7:
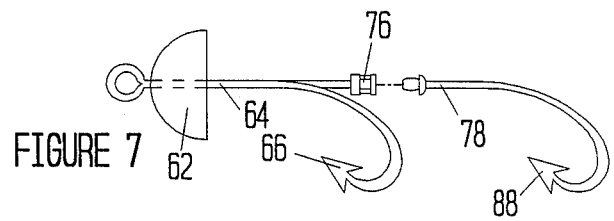
FIG. 7 is an elevational view of a head and hook assembly useful in the embodiments of the invention shown in FIGS. 5 and 6.

FIG. 7 illustrates the weighted head 62 and leader 64 and hook 6 of the bait 60 shown in FIG. 5. The weighted head 62 is a solidified mixture of sand and polyvinyl alcohol (which contains the aforementioned fish attractant), in which sufficient polyvinyl alcohol is filled with finely subdivided sand to obtain a solid form cast which is configured as a fish head which surrounds the leader. Typically, the sand and polyvinyl alcohol can be used in proportions from 20 to 80 percent sand, with the balance being polyvinyl alcohol. After curing into a solid, the resulting head and leader assembly can be used with a solid form lure in the manner described with reference to FIG. 5.

Figures 8, 9:
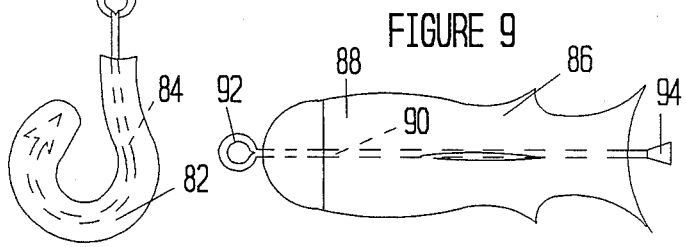
FIG. 8 is a view of an alternative bait of the invention.
FIG. 9 is an elevational view of a lure according to the invention.

The lure can also be supplied as a U-shaped solid form lure such as shown in FIG. 8. In this form, the lure 82 is simply threaded over the fishing hook 84 similar to the placement of a fishing worm on a hook. The lure 82 is formed similarly to the lures previously described with reference to FIGS. 4–6 and is a gelled polyvinyl alcohol solid, which contains the desired quantity of fish attractant to provide a slow release attractant in the water.

The lure can also be used, alone, without a hook. In this application, one or more lures 86 such as shown in FIG. 9 can be placed in the water about a boat, or at a selected fishing location. Preferably, a plurality of such lures are placed in the water and towed by a fishing boat, thereby broadcasting a scent trail in the water which leads directly to the fishing boat. For this purpose, a solid form lure 86 having a body 88 which is formed of the gelled polyvinyl alcohol containing the aforementioned quantity of fish attractant is used. The lure is threaded over a leader 90 which has a clip or eyelet 92 for attachment to a line. Preferably a second clip or eyelet 94 is provided at the opposite end of the leader 90, so that a plurality of lures can be strung together. The lure body 88 can have a core of sponge, such as described with reference to FIGS. 5 and 6, or can have a fabric reinforcement, such as described with reference to FIG. 4.

The overall effectiveness of the lures of this invention can be increased by spraying or dipping the fishing lines and leaders in a solution of polyvinyl alcohol which contains the fish attractant in the aforementioned concentrations. After application of the solution to the lines and leaders, the polyvinyl alcohol is permitted to cure into a film coating which will slowly dissolve in the water, augmenting the scent trail created by the aforementioned lures.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A fishing lure which comprises a body have the property of a slow dissolution rate in water and containing a fish attractant embedded within said body so that when said body dissolves in a body of water, said fish attractant is released into said water wherein said body is formed of polyvinyl alcohol having a limited rate of water dissolution.

2. The fishing lure of claim 1 wherein said polyvinyl alcohol includes from 0.5 to 5 weight percent glycerol to cross-link said polymer and thereby limit its water dissolution rate.

3. The fishing lure of claim 1 wherein said polyvinyl alcohol has from 50 to 95 percent of its ester groups hydrolyzed.

4. The fishing lure of claim 1 wherein said lure includes a body which supports a fish hook and wherein said attractant body is formed as a skirt which surrounds the lure body.

5. The fishing lures of claim 4 wherein said attractant body has a plurality of parallel slits formed a plurality of strips which are supported on said lure body.

6. The fishing lure of claim 5 wherein said attractant lure is formed of a sheet layer which has a plurality of coextensive and parallel slits which form said strips that extend from an unslit portion and wherein said unslit portion is wrapped about and secured to said lure body, whereby said plurality of strips extend rearwardly from said lure body and are free to move as the lure is pulled through the water.

7. The fishing lure of claim 1 wherein said body is molded of a solid polyvinyl alcohol polymer extended with sodium borate and containing from 0.5 to about 30 weight percent of said fish attractant.

8. The fishing lure of claim 7 wherein said fish attractant is fish meal.

9. A sheet material having a plurality of coextensive and parallel slits extending partially along it's length to form a plurality of strips which extend from an unslit portion, said sheet material being formed entirely of a polymer of polyvinyl alcohol with from 5 to 30 weight percent of a fish attractant comprising a water insoluble fish feed encapsulated with said polymer, and wherein said polymer has from 80 to 95 percent of its ester groups hydrolyzed and exhibits the property of a slow dissolution rate in water.

10. The sheet material of claim 9 wherein said polyvinyl alcohol is cross-linked with 0.5 to 10 weight percent glycerol.

11. The sheet material of claim 10 wherein said fish feed is a fish meal.

12. The sheet material of claim 10 wherein said fish feed is blood meal.

* * * * *

UNITED STATES PATENT AND TRADEMARK OFFICE
CERTIFICATE OF CORRECTION

PATENT NO.   : 4,875,305
DATED        : October 24, 1989
INVENTOR(S)  : John O. Bridges It is certified that error appears in the above-identified patent and that said Letters Patent is hereby corrected as shown below:

Claim 5, line 30, delete "formed" and insert therefor --forming--.

Signed and Sealed this

Sixth Day of November, 1990

Attest:

HARRY F. MANBECK, JR.

*Attesting Officer*   *Commissioner of Patents and Trademarks*